United States Patent
Behrendt et al.

(12) United States Patent (10) Patent No.: US 11,531,341 B2
(45) Date of Patent: Dec. 20, 2022

(54) MARINE AUTOPILOT SYSTEM

(71) Applicant: Garmin Switzerland GmbH, Schaffhausen (CH)

(72) Inventors: Thomas G. Behrendt, Paola, KS (US); David F. Lammers-Meis, Overland Park, KS (US); Jason D. Howe, Olathe, KS (US)

(73) Assignee: Garmin Switzerland GmbH

( * ) Notice: Subject to any disclaimer, the term of this patent is extended or adjusted under 35 U.S.C. 154(b) by 130 days.

(21) Appl. No.: 16/946,262

(22) Filed: Jun. 12, 2020

(65) Prior Publication Data
US 2021/0389765 A1    Dec. 16, 2021

(51) Int. Cl.
| | | |
|---|---|---|
| G06F 3/0488 | (2022.01) | |
| G05D 1/02 | (2020.01) | |
| G06F 3/04815 | (2022.01) | |
| G06F 3/04817 | (2022.01) | |
| G06F 3/04845 | (2022.01) | |
| G05D 1/00 | (2006.01) | |

(52) U.S. Cl.
CPC ......... *G05D 1/0206* (2013.01); *G05D 1/0016* (2013.01); *G06F 3/0488* (2013.01); *G06F 3/04815* (2013.01); *G06F 3/04817* (2013.01); *G06F 3/04845* (2013.01); *G06F 2203/04104* (2013.01)

(58) Field of Classification Search
CPC .... G06F 16/29; G06F 3/0482; G06F 3/04817; G06F 3/0484; G06F 9/451; G06F 2203/04104; G06F 2203/04808; G06F 3/013; G06F 3/017; G06F 3/0346; G06F 3/04815; G06F 3/04842; G06F 3/04845; G06F 3/0486; G06F 3/0488; G06F 3/14; G06F 3/167; G08G 3/00; G08G 3/02; G01C 21/22; G01C 21/203; G05D 1/00; G05D 1/02; G05D 1/0206; G05D 1/0094
See application file for complete search history.

(56) References Cited

U.S. PATENT DOCUMENTS

| | | |
|---|---|---|
| 3,807,345 A | 4/1974 | Peterson |
| 5,362,263 A | 11/1994 | Petty |
| 5,618,212 A | 4/1997 | Moore |
| 5,892,338 A | 4/1999 | Moore et al. |
| 6,126,497 A | 10/2000 | Stockton |
| 6,431,923 B1 | 8/2002 | Knight et al. |
| 6,468,117 B1 | 10/2002 | Healey |
| 7,538,511 B2 | 5/2009 | Samek |

(Continued)

OTHER PUBLICATIONS

Printout from https://www.cabelas.com/product/MINN-KOTA-ULTREX-COMBO-US-IP-BT/2403120.uts?slotId=0 published prior to Feb. 15, 2018.

(Continued)

*Primary Examiner* — Rayeez R Chowdhury
(74) *Attorney, Agent, or Firm* — Samuel M. Korte; Max M. Ali (57) ABSTRACT

Systems are disclosed for navigating a marine vessel with a navigation system that displays a planned route including a set of current and future waypoints. The system has a display and an integrated user input control. A new desired current heading and new future waypoints with associated future headings are provided and a corresponding autopilot navigates accordingly.

20 Claims, 5 Drawing Sheets

(56) References Cited

U.S. PATENT DOCUMENTS

| | | |
|---|---|---|
| 7,882,791 B2 | 2/2011 | Huntt |
| 8,761,976 B2 | 6/2014 | Salmon et al. |
| 8,991,280 B2 | 3/2015 | Wireman |
| 9,195,234 B2 | 11/2015 | Stephens |
| 9,290,256 B1 | 3/2016 | Wireman et al. |
| 9,354,809 B2 * | 5/2016 | Asahara ............... G01S 13/862 |
| 9,440,724 B2 | 9/2016 | Suzuki et al. |
| 9,676,462 B2 | 6/2017 | Bernloehr et al. |
| 9,988,134 B1 | 6/2018 | Gable et al. |
| 10,281,576 B2 | 5/2019 | DePasqua |
| 10,336,425 B2 | 7/2019 | Laster |
| 10,513,322 B2 | 12/2019 | Clark et al. |
| 2005/0263058 A1 | 12/2005 | Suemori et al. |
| 2006/0089794 A1 * | 4/2006 | DePasqua ............ G01C 21/203 |
| | | 701/532 |
| 2006/0116796 A1 | 6/2006 | Fossen et al. |
| 2007/0073454 A1 | 3/2007 | Kaji et al. |
| 2007/0089660 A1 | 4/2007 | Bradley et al. |
| 2007/0162207 A1 | 7/2007 | Shimo et al. |
| 2007/0178779 A1 | 8/2007 | Takada et al. |
| 2009/0037040 A1 | 2/2009 | Salmon et al. |
| 2009/0171520 A1 | 7/2009 | Kaji |
| 2010/0023192 A1 | 1/2010 | Rae et al. |
| 2010/0138083 A1 | 6/2010 | Kaji |
| 2010/0145558 A1 | 6/2010 | Kaji |
| 2011/0153126 A1 | 6/2011 | Arbuckle et al. |
| 2011/0166724 A1 | 7/2011 | Hiramatsu |
| 2011/0172858 A1 | 7/2011 | Gustin et al. |
| 2012/0072059 A1 | 3/2012 | Glaeser |
| 2012/0129410 A1 | 5/2012 | Tyers |
| 2012/0232719 A1 | 9/2012 | Salmon et al. |
| 2015/0089427 A1 * | 3/2015 | Akuzawa ............. G05D 1/0206 |
| | | 715/771 |
| 2015/0346730 A1 | 12/2015 | Stephens et al. |
| 2016/0016651 A1 | 1/2016 | Anderson et al. |
| 2016/0101838 A1 | 4/2016 | Kojima |
| 2016/0246300 A1 | 8/2016 | Langford-Wood |
| 2016/0252907 A1 | 9/2016 | Parkinson |
| 2016/0334792 A1 | 11/2016 | Jopling |
| 2017/0205828 A1 | 7/2017 | Estabrook |
| 2017/0205829 A1 | 7/2017 | Tyers |
| 2017/0210449 A1 | 7/2017 | Frisbie et al. |
| 2017/0253314 A1 | 9/2017 | Ward |
| 2017/0255200 A1 | 9/2017 | Arbuckle et al. |
| 2017/0277189 A1 | 9/2017 | Johnson et al. |
| 2017/0349257 A1 | 12/2017 | Hara et al. |
| 2017/0365175 A1 | 12/2017 | Harnett |
| 2018/0015994 A1 | 1/2018 | Kishimoto et al. |
| 2018/0057132 A1 | 3/2018 | Ward et al. |
| 2018/0094934 A1 * | 4/2018 | Rivers ................ G05D 1/0206 |
| 2019/0047675 A1 * | 2/2019 | Clark ................. G05D 1/0208 |
| 2019/0155288 A1 | 5/2019 | Arbuckle et al. |
| 2019/0176950 A1 | 6/2019 | Whiteside et al. |
| 2019/0179318 A1 | 6/2019 | Miller et al. |
| 2019/0204837 A1 | 7/2019 | Estabrook |
| 2019/0344875 A1 * | 11/2019 | Kishimoto ......... G01C 21/3407 |
| 2019/0361457 A1 | 11/2019 | Johnson et al. |

OTHER PUBLICATIONS

Printout from https://www.cabelas.com/product/MOTORGUIDE-XI-W-PINPOINT-GPS-BOW-MOUNT/1701905.uts?slotId=0 published prior to Feb. 15, 2018.

* cited by examiner

MARINE AUTOPILOT SYSTEM

BACKGROUND

Marine vessels, such as boats and ships, often include autopilots that autonomously steer the vessels. Paper or electronic charts can be used to identify and provide coordinates to which the autopilot will steer. However, with conventional autopilots, repeatedly updating navigation coordinates is a slow and cumbersome if a user wants to navigate along a shoreline or a particular marine geographical feature.

SUMMARY

Techniques are disclosed to enable a system for navigating a marine vessel by way of first and second motors. The system has a navigation user interface that itself has a display that provides a representation of a planned route of the marine vessel. The planned route includes a current waypoint and one or more future waypoints. The current waypoint includes a current position and heading pair, and the future waypoints include one or more future position and heading pairs, the current waypoint and the future waypoints each being graphically represented by respective waypoint icons. The system also has a user input control integrated with the display and configured to receive user input to modify the planned route by providing a new desired current heading and new future waypoints as well as a route control system in communication with the motors. The route control system is configured to receive a position measurement, a heading measurement, and a velocity measurement for the marine vessel. It is also configured to calculate an updated future route based on the received position, heading, and velocity measurements and the user input, the updated future route comprising an updated current waypoint having an updated current position and an updated current heading and corresponding updated future waypoints, including a next updated future waypoint and subsequent updated future waypoints. It is further configured to refresh the display based on the updated future route and to generate first and second control signals for the first and second motors based at least in part on the updated current heading and the next updated future waypoint.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWINGS

The figures described below depict various embodiments of the present invention. It is understood that these figures depict exemplary embodiments. The exemplary features illustrated in the figures are intended to represent these aspects of the various disclosed embodiments and not intended to limit the claimed scope to any particular feature. Further, whenever possible, the following description refers to the reference numerals included in the figures, in which features depicted in multiple figures are designated with consistent reference numerals.

The figures are not intended to limit the present invention to the specific embodiments they depict. The drawings are not necessarily to scale.

DETAILED DESCRIPTION

The following text sets forth a detailed description of numerous different embodiments. However, it is understood that the detailed description is to be construed as exemplary only and does not describe every possible embodiment since describing every possible embodiment would be impractical. In light of the teachings and disclosures herein, numerous alternative embodiments may be implemented.

It is understood that, unless a term is expressly defined in this patent application using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

The following detailed description of the technology references the accompanying drawings that illustrate specific embodiments in which the technology may be practiced. The embodiments are intended to describe aspects of the technology in sufficient detail to enable those skilled in the art to practice the technology. Other embodiments may be utilized and changes may be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology may include a variety of combinations and/or integrations of the embodiments described herein.

Various embodiments describe a marine navigation system providing individualized display modeling and touchpoint navigation control for inputting navigation information for an autopilot of a marine vessel operating in a marine environment. In various embodiments, the system advantageously displays a graphically representative model of the vessel, including proportionally accurate dimensions, to facilitate determining a heading or course of the vessel through the marine environment, and advantageously enables touchpoint input for more quickly and easily entering, revising, and updating navigation instructions including future headings at intermediate future waypoints.

In an embodiment, a navigation system is provided for assisting a user in navigating a marine vessel through a marine environment to a desired position, and includes a display and a user interface for providing user input. The display (e.g., a chartplotter) may display a representation of the marine environment (e.g., a chart or camera image) and a graphical representation of the marine vessel that reflects its characteristics (e.g., an icon, schematic, photograph or camera image) in the marine environment. In various embodiments, one or two dimensions of the representation of the vessel are proportional to the same dimensions of the actual vessel. The user interface may be a touchscreen or buttons and/or a joystick that are integrated with the display, which enables a user to provide input defining a navigation route through the marine environment to a desired position by physically touching or otherwise selecting the representation of the vessel and by physically touching or otherwise selecting a point on the representation of the marine environment spaced apart from the representation of the vessel, thereby defining the navigation route at least in part by specifying intermediate waypoints, each of which may include an independently specified heading or directional orientation of the boat. In an embodiment, a waypoint is defined by at least a pair of characteristics, namely a position and heading, the position being for example a pair of geographic coordinates and the heading a direction between zero and 360 degrees. It is understood that heading or orientation pertains to a compass direction and can be specified in any way that a direction can be specified.

In an embodiment, the user interface may further enable the user to physically touch the representation of the marine vessel at two points and move one point around the other point to rotate the representation of the marine vessel to a desired orientation or heading. This may also be done with buttons and/or a joystick. This can also be accomplished with a touch or pressure sensitive touchscreen by pressing on the marine vessel representation and twisting or rotating the orientation of the displayed vessel representation. In various embodiments, the display and user interface may interface with marine navigation component of a marine autopilot which translates the intermediate waypoints into direction and distance information, thereby automatically steering the vessel along the navigation route, with the specified future headings or directional orientation of the vessel at each waypoint where a future heading was specified.

In various embodiments, the user interface enables the user to physically trace the navigation route between the representation of the vessel and the point on the representation of the marine environment. In one embodiment, when the user physically touches the representation of the vessel, the display unit may display a ghost image of the representation of the vessel, and the input control may enable the user to physically trace the navigation route by dragging the ghost image to the point on the representation of the marine environment. The representation of the marine environment may be displayed at a particular scale, and within a range of scales in which the representation of the vessel is usefully visible (i.e., neither too large nor too small to be useful to the user), the display may display the representation of the vessel at the same particular scale.

In various embodiments, the display indicates an uncertainty of a position of the vessel in the marine environment, the uncertainty of the position may be indicated by a perimeter or uncertainty region extending around the representation of the vessel, and the display unit may calculate a quality metric for the uncertainty of the position of the vessel and warn the user when the quality metric indicates that the uncertainty of the position exceeds a specified safety threshold for reliability (of, e.g., autopilot control).

Figure 1:
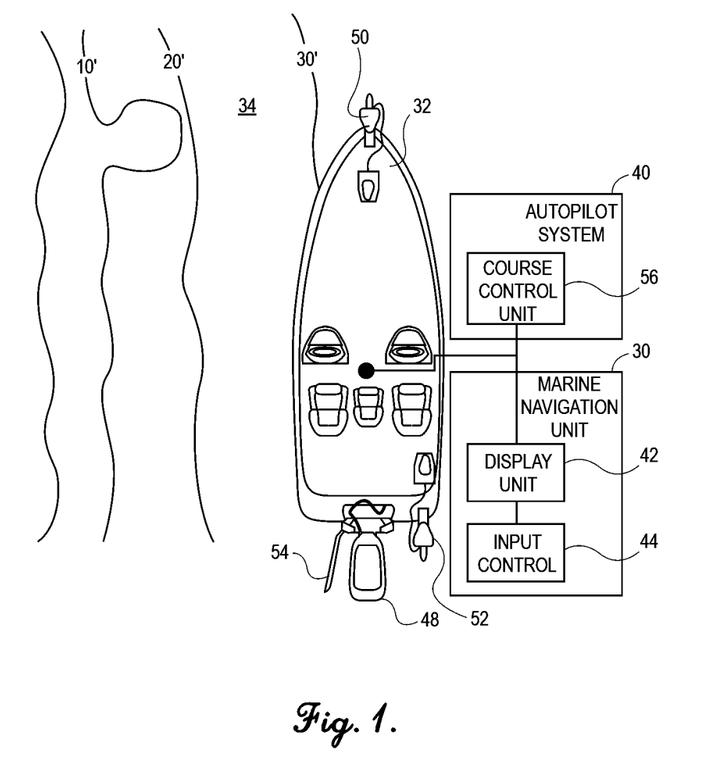
FIG. 1 is a fragmentary plan depiction of an embodiment of a marine navigation system providing individualized display modeling and touchpoint navigation control for inputting navigation information for an autopilot, wherein the system is shown associated with a marine vessel operating in a marine environment.

FIG. 1 is a fragmentary plan depiction of an embodiment of a marine navigation system providing individualized display modeling and touchpoint navigation control for inputting navigation information for an autopilot. The system is on a marine vessel 32 operating in a representative marine environment 34 as shown with depth contour lines at thirty feet, twenty feet, and ten feet. The marine navigation system as shown provides individualized display modeling and touchpoint navigation control for entering navigation information into an autopilot 40 of the marine vessel 32. The vessel 32 may be any boat, ship, or other vehicle configured to travel in, on, or over water, including substantially any suitable size, type, and overall design, and which would benefit from the disclosed navigation system. The marine environment 34 may be substantially any aquatic environment, including so-called "brown" or "blue" water environments, such as rivers, lakes, coastal areas, seas, and oceans. In one embodiment of the navigation system and elements of an example operational context, the vessel 32 may include one or more motors 48, 50, and 52, and an autopilot 40. In various embodiments, the marine navigation unit includes display unit 42 and input control 44.

The motors 48, 50, and 52 are configured to drive and maneuver the vessel 32 through the marine environment 34. In various embodiments, the motors include the primary motor 48 configured to provide a primary propulsive force for driving the vessel 32, especially forwardly, through the marine environment 34. In one embodiment, the primary motor 48 may be mounted to a rear portion (e.g., stern or transom) of the vessel 32. In various embodiments, the primary motor is an internal-combustion outboard motor, but it is understood that the motor 48 could be any suitable primary marine motor, such as an in-board motor of any type. The motors may further include one or more secondary motors, such as the electrical trolling motors 50 and 52 configured to provide a secondary propulsive force for steering or otherwise maneuvering the vessel 32 through the marine environment 34. The secondary motors 50 and 52 may be used with the primary motor 48 to enhance steering, or without the primary motor 48 when maneuvering the vessel 32 in situations that require relatively higher precision (e.g., navigating around other boats or other obstacles and/or in relatively shallow water). The secondary motors 50 and 52 may be used to steer the vessel 32 and/or may be used to maintain the vessel 32 at a substantially fixed position and/or orientation in the water. In various embodiments, the secondary motors 50 and 52 may be mounted to any suitable portion of the vessel 32 (e.g., at or near a bow, stem, and/or starboard or port side of the vessel 32) depending on the characteristics of the secondary motors 50 and 52 and structural characteristics of the vessel 32. The motors may employ substantially any suitable technology for accomplishing their stated functions, such as gasoline, diesel, and/or electric technologies.

In various embodiments, the course control unit (CCU) 56 is a control system that may be configured to facilitate a user controlling the movement and orientation of the vessel 32. Depending on the design of the vessel 32, this may include controlling the amount of thrust provided by and/or the orientation of some or all of its motors and/or a position of a rudder 54 or other control surfaces. In various embodiments, this is carried out by providing control signals to at least one of the motors 48, 50, 52 or the rudder 54. As shown in the figure, the rudder 54 is a stand-alone rudder next to the outboard motor 48. It is understood that the rudder 54 may also be an integral rudder integrated into and located at the bottom of the outboard motor 48. It is also understood that the rudder 54 and/or the outboard motor 48 are not necessary to practice the present teachings. In various embodiments, only the motors 50 and 52 are employed.

The autopilot 40 may be configured to provide autonomous steering functionality with regard to reaching, maintaining, or returning to a set position, heading, or course of the vessel 32 through the marine environment 34. In various embodiments, the autopilot 40 employs the CCU 56 that functions as a control system or processing component of the autopilot 40. The CCU 56 may be implemented as any suitable number and/or type of computer processors that receive autopilot data, geographic position data, routing data, rudder positional data, motor positional data, and/or other relevant data and utilize any combination of this data to facilitate autonomous control of the motors and/or rudder 54.

The autopilot 40 may receive any suitable type of information relevant to its functionality. Geographic position data may include geographic coordinates obtained from the position-determining component indicating the current location of the vessel 32, the current speed and heading of the vessel 32, the current time, etc. The autopilot 40 may determine a heading for the vessel 32 based on the received geographic position data (received from a position-determining component, such as a GPS receiver) and/or sensory information (e.g., from a gyroscope, accelerometer, magnetometer, etc.). The sensory information may be received from a sensor integrated within the autopilot 40 or received from an external sensory source. In various embodiments, the autopilot 40 may determine a tilt angle, acceleration, and magnetic heading of the vessel 32 and determine a current heading of the vessel 32 based on the determined tilt angle, acceleration, and magnetic heading. Because wind and/or water currents may cause the vessel 32 to occasionally point in a direction that is different than its direction of travel, the autopilot 40 may use the sensory information to determine the direction the vessel 32 is pointing and its direction of travel. In an embodiment, the autopilot 40 may additionally receive rudder position feedback from a rudder transducer indicative of a current position of the rudder 54.

The CCU 56 may utilize some or all of this data to control the motors and/or to determine whether the rudder needs to be repositioned by analyzing the current position of the rudder 54 and the current heading and/or course of the vessel 32. Thus, the CCU 56 determines an amount to reposition the rudder 54 to reach, maintain, or return to a location, heading, or course. When maintaining a heading, the CCU 56 may determine a current compass heading of the vessel 32 based on sensory information (e.g., from a gyroscope, accelerometer, magnetometer, etc.) and/or geographic position information received from a position-determining component (e.g., a GPS receiver). The CCU 56 may send commands to an actuator coupled with the rudder 54 or other control surface or mechanism to steer the vessel 32 so as to maintain the current heading. When following a course, the CCU 56 may receive or access from memory directional vectors for one or more legs of a defined navigation route and may send commands to the actuator to cause changes in the position of the rudder 54 to steer the vessel 32 based on the directional vector information.

Navigation systems consistent with the present teachings may be configured to inform the user and/or the autopilot 40 with regard to operating the CCU 56 in accordance with a navigation route. In various embodiments, the navigation systems may include one or more sensors for detecting an orientation, change in orientation, direction, change in direction, position, and/or change in position of the vessel 32. In one embodiment, the navigation system is able to access a location determining component that is configured to detect a position measurement for the vessel 32 (e.g., geographic coordinates of at least one reference point on the vessel 32, such as a motor location, vessel center, bow location, stern location, etc.). In one embodiment, the location determining component may be a global navigation satellite system (GNSS) receiver (e.g., a global positioning system (GPS) receiver, software defined (e.g., multi-protocol) receiver, or the like). In one embodiment, the navigation system is configured to receive a position measurement from another device, such as an external location determining component or from at least one of the motors. Other positioning-determining technologies may include a server in a server-based architecture, a ground-based infrastructure, one or more sensors (e.g., gyros or odometers), a Global Orbiting Navigation Satellite System (GLONASS), a Galileo navigation system, and the like.

Additionally or alternatively, the navigation system may include a magnetometer configured to detect an orientation measurement for the vessel 32. For example, the magnetometer may be configured to detect a direction in which the bow of the vessel 32 is pointed and/or a heading of the vessel 32. In one embodiment, the navigation system may be configured to receive an orientation measurement from another device, such as an external magnetometer, a location determining device, and/or the motors. In one embodiment, the navigation system may include or be communicatively coupled with at least one inertial sensor (e.g., accelerometer and/or gyroscope) for detecting the orientation or change in orientation of the vessel 32. For example, an inertial sensor may be used instead of or in addition to the magnetometer to detect the orientation.

The navigation system may include a processing system communicatively coupled to the location and orientation determining components and configured to receive the position and orientation measurements and to control the integration and other processing and display of this and other navigation information and may perform other functions described herein. The processing system may be implemented in hardware, software, firmware, or a combination thereof, and may include any number of processors, controllers, microprocessors, microcontrollers, programmable logic controllers (PLCs), field-programmable gate arrays (FPGAs), application specific integrated circuits (ASICs), or any other component or components that are operable to perform, or assist in the performance of, the operations described herein. The processing system may also be communicatively coupled to or include electronic memory for storing instructions or data. The memory may be a single component or may be a combination of components that provide the requisite storage functionality. The memory may include various types of volatile or non-volatile memory such as flash memory, optical discs, magnetic storage devices, SRAM, DRAM, or other memory devices capable of storing data and instructions.

The navigation system may further include a display unit 42 and an input control 44. The display unit 42 may be configured to display for the user a representation of the marine environment 60 and a representation of the marine vessel 62 in the representation of the marine environment 60. In various embodiments, the representation of the marine environment 60 may be a chart or a camera image (from, e.g., a drone, aircraft, or satellite) of the actual marine environment 34. The display unit 42 may be further configured to display marine radar pages, overhead two-dimensional point cloud pages of objects detected by sensors, radar or stereo camera images, and/or birds-eye view camera images, and/or three-dimensional pages of these applications.

Figure 2:
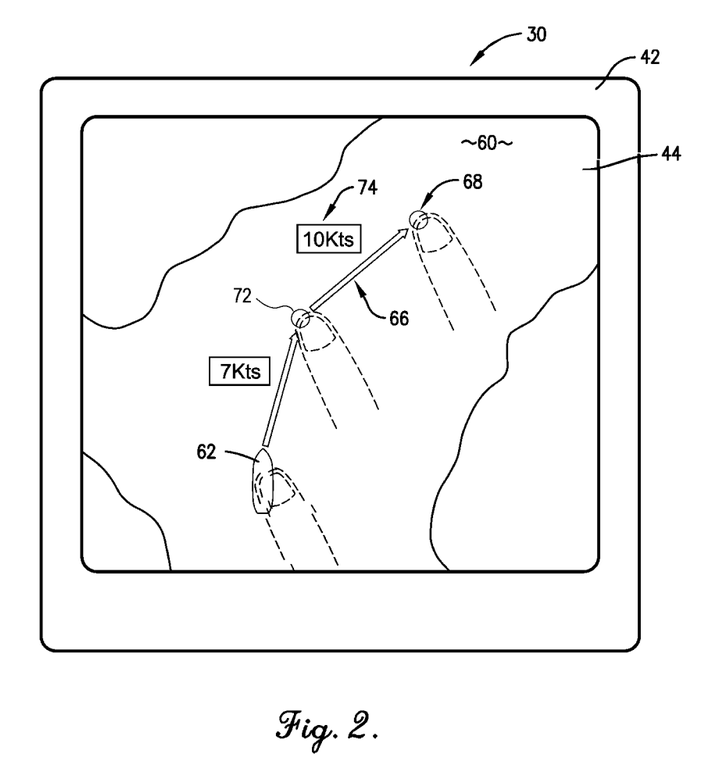
FIG. 2 is a plan depiction of an embodiment of a display unit component and an input control component of the navigation system of FIG. 1, wherein an object (e.g., a user's finger, shown in broken line) is used on the input control integrated into the display unit to define a navigation route using a representation of the vessel and a representation of the marine environment.

FIG. 2 is a plan depiction of an embodiment of navigation system 30, a display unit 42 integrated with with an exemplary integrated touch screen input control 44 of the navigation system of FIG. 1, wherein an object (e.g., a user's finger, shown in broken line) is used on the input control integrated into the display unit 42 to define a navigation route using a representation of the vessel and a representation of the marine environment 60. In various embodiments, the representation of the vessel 62 may be displayed as a generic icon or symbol, custom-rendered image, or actual overhead or other camera image of the actual vessel 32. At least one dimension (length, width, and/or shape) or at least two dimensions of the representation of the vessel 62 may be proportional to the same dimensions of the actual vessel 32.

As shown in FIG. 2, via input control 44, a user can provide a hand-drawn path by dragging the vessel representation 62 along a path to specify a future route or course. In various embodiments, the navigation system performs automatic smoothing of this hand-drawn path by calculating, for example, an optimally direct route in connection with the autopilot based on the additional existing autopilot parameters. In an embodiment, this path can be edited by way of vectors, nodes, or handles in a manner that is analogous to the way vector graphics are manipulated in vector graphic programs such as computer automated drafting ("CAD") programs. In various embodiments, the navigation system provides the ability to define a constant heading angle relative to the path of travel over all (or a portion) of the course or route specified by the user and/or relative to cardinal directions. In various embodiments, the navigation system provides the ability to control the heading or orientation of the vessel, as well as rotational direction and speed, relative to the radius of an orbital path around a centroid (such as an island, piece of underwater structure, or a fish feeder, etc.

In various embodiments, the navigation system provides an automatic speed control based on the heading of the vessel relative to the path of travel (i.e. employing slower speeds for sideways maneuvers), as well as calculating and displaying an automatic time-of-arrival adjustment at the display unit 42. In an embodiment, the navigation system allows the user by way of the input control 44 to place a vessel representation 62 into a desired final position and heading in a 2-D or 3-D scene, thereby allowing the autopilot to automatically pilot the boat to that position and heading.

In an embodiment, the navigation system automatically maintains a user-specified heading and distance (as specified by the user as set forth in connection with the present teachings) relative to a shoreline or other marine geographic feature while moving along the marine feature at a user-specified speed and direction of travel. In an embodiment, the marine feature and position data is accessed and/or calculated in connection with a combination of GPS data, magnetometer, and map data. In an embodiment, the navigation system measures distance characteristics from a marine geographic feature by scanning the feature. In an embodiment, such a scanning operation is carried out in real-time with radar or LIDAR, etc. In an embodiment, the navigation system enables the user to store heading as well as location data in connection with particular waypoints so that a navigate-to-waypoint autopilot function automatically navigates the boat to a specified desired location and heading associated with the waypoint. In an embodiment, in connection with shallow-water anchor mechanism such as a pole-based dig in anchor, the anchor is automatically deployed when the actual vessel 32 reaches the desired location and heading. In configurations lacking a shallow-water anchor mechanism, the navigation system 30 can maintain the boat's position and heading when the boat arrives at the desired waypoint at the end of the route. Thus, embodiments of the present invention may provide actual and/or virtual anchoring functionality that holds the boat at its destination location with a desired heading.

The display unit 42 may be further configured to display the representation of the marine environment 60 at a particular scale, and to also display the representation of the vessel 62 at the particular scale if the particular scale is within a range of scales in which the representation of the vessel 62 is usefully visible (i.e., neither too large nor too small to be useful to the user, which may depend on the size of the display unit 42). For example, if the user were to zoom in on the representation of the marine environment 60 to a scale at which the representation of the vessel 62 would appear so large on the display unit 42 (e.g., over 30% of the width of the screen) as to interfere with the functionality described herein, then the representation of the vessel 62 may not be displayed at the same scale. Similarly, if the user were to zoom out on the representation of the marine environment 60 to a scale at which the representation of the vessel 62 would appear so small on the display unit 42 (e.g., less than 5% of the width of the screen) as to interfere with the functionality described herein, then the representation of the vessel 62 may not be displayed at the same scale. When the scale is not useful for displaying the representation of the vessel 62, an alternate vessel icon or image may be used to indicate for the user that the vessel is not accurately scaled.

In general, the display unit 42 may substantially accurately display the position and heading of the vessel 62 with reference to the representation of the marine environment 60. Settings to display the accurate position may include a GPS antenna offset for front/back, left/right, and/or height above the water. Further, the display unit 42 may display indications for pitch and/or roll on three-dimensional pages. However, the display unit 42 may be further configured to indicate an uncertainty of a position of the vessel 62 in the marine environment 34.

Figure 3:
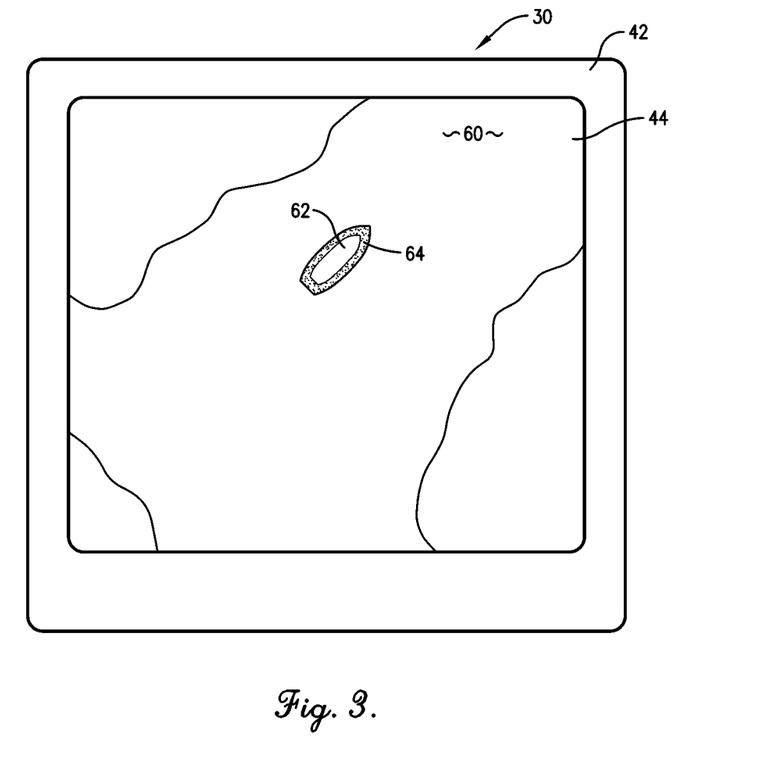
FIG. 3 is a plan depiction of an embodiment of the display unit and the input control of FIG. 2, wherein an uncertainty of a position of the vessel is communicated by a perimeter (indicated by stippling) around the representation of the vessel.

FIG. 3 is a plan depiction of an embodiment of the navigation system 30 integrated with the display unit 42 and the input control 44 of FIG. 2, wherein an uncertainty of a position of the vessel 62 is communicated by a perimeter 64 (indicated by stippling) around the representation of the vessel. In one embodiment, the uncertainty of the position may be indicated by the perimeter 64 displayed around the representation of the vessel 62. The perimeter 64 may be indicated by an uncertainty region comprising a shaded area or boundary line, and may change dynamically depending on the real-time calculated uncertainty of the position of the vessel 62. The uncertainty of position may independently account for the north/south uncertainty and east/west uncertainty. In one embodiment, the display unit 42 may be further configured to calculate a quality metric for the uncertainty of the position of the vessel 62, and to visually, audibly, and/or otherwise warn the user when the quality metric indicates that the uncertainty of the position exceeds a specified safety threshold for reliability (of, e.g., the operation of the autopilot).

The display unit 42 may be further configured to indicate additional relevant information, such as the direction, speed, pitch, roll, and/or other properties or characteristics of the vessel 62 and/or its performance, and/or wind speed, current speed, depth, and/or other properties or conditions of the marine environment 60. The display unit 42 may be further configured to display on command a navigation route previously inputted by the user, as described below.

The display unit 42 may employ substantially any suitable technology for accomplishing its stated functions, such as liquid crystal display (LCD), light-emitting diode (LED) display, light-emitting polymer (LEP) display, thin film transistor (TFT) display, gas plasma display, or any other type of display. The display unit 42 may be backlit such that it may be viewed in the dark or other low-light environments. The display unit 42 may be of any size and/or aspect ratio. In one embodiment, the display unit 42 may be a chartplotter such as is commonly used in marine navigation and which integrates and displays position data with electronic navigation charts.

Figure 4:
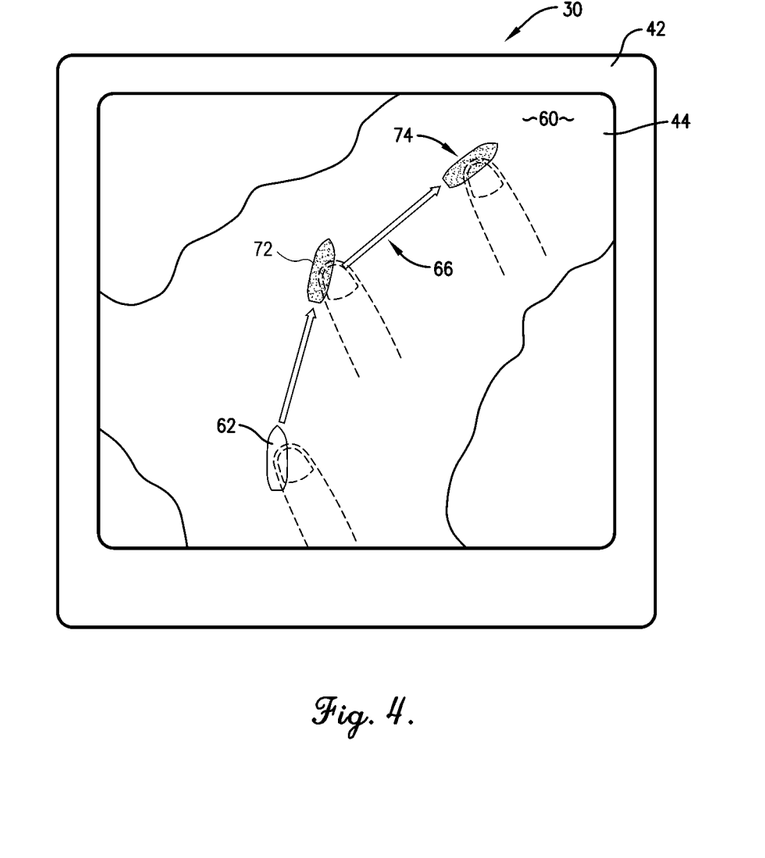
FIG. 4 is a plan depiction of an embodiment of the display unit and the input control of FIG. 2, wherein the display unit displays a ghost image (indicated by stippling) of the vessel which the user drags to define the navigation route.

FIG. 4 is a plan depiction of an embodiment of the display unit and the input control of FIG. 2, wherein the display unit displays a ghost image (indicated by stippling) of the vessel which the user drags to define the navigation route. The input control 44 may be partially or fully integrated with the display unit 42 and configured to enable the user to provide an input defining a navigation route 66 through the marine environment 60 to a desired position by physically touching the representation of the vessel 62 and by physically touching one or more points 68 on the representation of the marine environment 60 spaced apart from the representation of the marine vessel 62, thereby defining the navigation route 66 therebetween, In one embodiment, the input control may be further configured to enable the user to physically trace the navigation route 66 between the representation of the vessel 62 and the point 68 on the representation of the marine environment 60. In one embodiment, when the user physically touches the representation of the vessel 62, the display unit 42 may display a ghost image 72 of the representation of the vessel 62, and the input control 44 may enable the user to physically trace the navigation route 66 by dragging the ghost image 72 to the point 68 on the representation of the marine environment 60, thereby modifying the planned route by way of moving the respective associated icons corresponding to the waypoints, including the subsequent future waypoints whose location may be similarly modified. Once the autopilot 40 has recomputed the new route and associated parameters, the display is refreshed based on the modified route or course.

The input control 44 may be further configured to enable the user to separately enter a desired speed 74 of the vessel 32 along the navigation route 66. In one embodiment, the input control 44 may enable the user to select or otherwise specify automatic speed settings and/or custom speed settings which may include rate-of-turn and directional travel speed.

The input control 44 may be implemented using substantially any suitable touch- or contact-based technology such as resistive, capacitive, or infrared touchscreen technologies, or any combination thereof for accomplishing its stated functions. Further, the user may employ substantially any suitable object, such as a finger, stylus, pen, or stick to touch the input control 44 and thereby provide the input. The navigation system may further include additional input technologies which may enable the user to provide inputs regarding operation of some or all of the other components of the navigation system. These additional input technologies may include substantially any suitable technologies, such as electromechanical input devices (e.g., buttons, switches, toggles, trackballs, and the like), touch-sensitive input devices (e.g., touchpads, touch panels, trackpads, and the like), pressure-sensitive input devices (e.g., force sensors or force-sensitive touchpads, touch panels, trackpads, buttons, switches, toggles, trackballs, and the like), audio input devices (e.g., microphones), cameras (e.g., for detecting user gestures or for face/object recognition), or a combination thereof.

In one embodiment, the display unit 42 and input control 44 may enable a GPS offset feature for a fishing chart. A crosshair or similar icon may be used in place of the vessel icon, and the GPS antenna offset settings may be used to position the cursor in the location of a transducer or a transducer position offset setting may be used and associated with each transducer in reference to the GPS antenna.

The navigation system, particularly the display unit 42 and the input control 44, may be configured to interface with the CCU 56 of the autopilot 40, and the CCU 56 may be configured to translate the input defining the navigation route 66 into direction and distance information, and combine this with the speed indicated by the user, and use this information to automatically maneuver the vessel 32 along the navigation route 66 through the marine environment 60.

Figure 5:
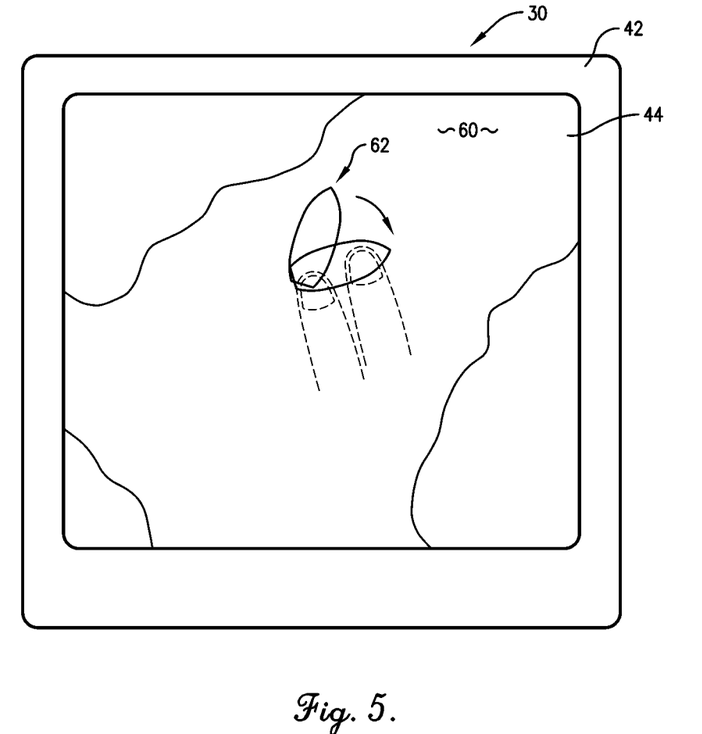
FIG. 5 is a plan depiction of a rotation feature enabled by the display unit and input control of FIG. 2, wherein the user uses two fingers to rotate the representation of the vessel to a desired orientation heading.

FIG. 5 is a plan depiction of a rotation feature enabled by the display unit and input control of FIG. 2, wherein the user uses two fingers to rotate the representation of the vessel to a desired orientation heading. In an embodiment, the user may physically touch the representation of the vessel 62 on the touchscreen at two points by employing a multi-touch gesture (e.g., with two fingers or other objects) and move one point around the other point to rotate the representation of the vessel 62 to a desired orientation heading. The desired orientation heading may be independent of any navigational heading the CCU 56 may implement to counter current or wind effects and thereby maintain the vessel's course to the desired position. Thus, the desired orientation heading may point the vessel in a particular direction to facilitate some activity, such as fishing, while the CCU 56 uses the engines or other technologies to implement a navigational heading independent of the desired orientation heading. The route tracing feature and the rotation feature may be combined to enable the user to both move and rotate the representation of the vessel 62 and/or the ghost image thereof. In various embodiments, the navigation system provides the option to touch the vessel representation 62, or a heading button associated with the vessel representation 62 while underway to adjust the heading of the vessel in real time, or "on-thefly." In various embodiments, touching the vessel representation 62 could cause "handles" to appear on the boat icon, allowing touch rotation to specify a real-time updated heading. In an embodiment, simply touching the vessel representation 62 with a multi-touch gesture enables a multi-touch rotation to specify a new heading or orientation of the vessel representation 62.

Although the present teachings are described with reference to various embodiments illustrated in the figures, it is understood that equivalents may be employed and substitutions made herein without departing from the scope of the invention as set forth in the below claims. Having thus described various embodiments of the technology, what is claimed as new and desired to be protected by Letters Patent includes the following claims.

What is claimed is:

1. A system for navigating a marine vessel by way of a first motor coupled to a first portion of the marine vessel and a second motor coupled to a second portion of the marine vessel, the system comprising:
   a display that provides a representation of a planned route of the marine vessel including a plurality of waypoint icons associated with a current waypoint and one or more future waypoints along the planned route, the current waypoint comprising a current position and a current heading of the marine vessel, and the one or more future waypoints each comprising a planned position and a planned heading of the marine vessel along the planned route;
   a user input control integrated with the display and configured to receive a user input to modify the planned route by providing a desired heading for the current waypoint; and
   a route control system in communication with the first motor and the second motor, the route control system configured to:
      receive a current position measurement and a current heading measurement for the marine vessel;
      calculate an updated route based on the planned route, the received current position and current heading measurements and the user input of the desired heading for the current waypoint, the updated route comprising an updated current waypoint having the desired heading for the current waypoint; and
      generate first and second control signals for the first and second motors, respectively, based at least in part on the updated route, including the desired heading for the current waypoint;
   wherein the display is refreshed to present the updated route.

2. The system of claim 1, wherein the user input control comprises a touch screen interface.

3. The system of claim 2, wherein the user input to provide a desired heading of the waypoint icon associated with the current waypoint comprises a first touch input on the waypoint icon and a second touch input rotating the waypoint icon.

4. The system of claim 2, wherein the user input comprises a two-point multi-touch gesture.

5. The system of claim 1, wherein the user input control comprises at least one of a button and a joystick, wherein the waypoint icon associated with the current waypoint is selected and repositioned based on user inputs received by the button or joystick.

6. The system of claim 1, wherein the waypoint icons reflect a shape and scale associated with the marine vessel.

7. The system of claim 6, wherein the plurality of waypoint icons are based on an overhead photograph of the marine vessel.

8. The system of claim 6, wherein the plurality of waypoint icons are based on a schematic representation of the marine vessel.

9. The system of claim 6, wherein the plurality of waypoint icons further comprise an uncertainty region extended to scale beyond a perimeter of each waypoint icon.

10. A system for navigating a marine vessel by way of a first motor coupled to a bow portion of the marine vessel and a second motor coupled to a stern portion of the marine vessel, the system comprising:
    a display that provides a representation of a planned route of the marine vessel including a plurality of waypoint icons associated with a current waypoint and one or more future waypoints along the planned route, the current waypoint comprising a current position and a current heading of the marine vessel, and the one or more future waypoints each comprising a planned position and a planned heading of the marine vessel along the planned route;
    a user touchscreen integrated with the display and configured to receive a user input to modify the planned route by providing a desired heading for the current waypoint and a desired heading for one or more future waypoints, wherein the user input for the desired heading of each of the plurality of waypoint icons comprises a two-point multi-touch gesture on the waypoint icon and rotating the waypoint icon to provide the desired heading for the respective waypoint;
    a control system in communication with the first motor and the second motor, the control system configured to:
       receive a current position measurement and a current heading measurement for the marine vessel;
       calculate an updated route based on the planned route, the received current position and current heading measurements and the user input of the desired heading for the current waypoint and the desired heading for one or more future waypoints, the updated route comprising an updated current waypoint having the desired heading for the current waypoint and one or more updated future waypoints having the desired heading for the one or more future waypoints; and
       generate first and second control signals for the first and second motors based at least in part on the updated route;
    wherein the display is refreshed to present the updated route.

11. The system of claim 10, wherein the waypoint icons are based on an overhead photograph of the marine vessel.

12. The system of claim 10, wherein the plurality of waypoint icons further comprise an uncertainty region extended to scale beyond a perimeter of each waypoint icon.

13. The system of claim 1, wherein the heading is a directional orientation of the marine vessel.

14. The system of claim 10, wherein the heading is a directional orientation of the marine vessel.

15. The system of claim 1, wherein the current position of the marine vessel for the current waypoint is a current geolocation of the marine vessel.

16. The system of claim 10, wherein the current position of the marine vessel for the current waypoint is a current geolocation of the marine vessel.

17. The system of claim 1, wherein one of the one or more future waypoints is a destination, and wherein the route control system is further configured to maintain the desired heading for the destination once the route control system receives a current position measurement corresponding to the destination.

18. The system of claim 10, wherein one of the one or more future waypoints is a destination, and wherein the route control system is further configured to maintain the desired heading for the destination once the route control system receives a current position measurement corresponding to the destination.

19. The system of claim 1, wherein the user input control is further configured to receive a user input after the marine vessel has began traveling along the updated route by providing an adjustment to the desired heading for the current waypoint, wherein the route control system is further configured to modify the updated route based on the adjustment to the desired heading in real time.

20. The system of claim 10, wherein the user touchscreen is further configured to receive a user input after the marine vessel has began traveling along the updated route by providing an adjustment to one of the desired heading for the current waypoint or the desired heading for the one or more future waypoints along the updated route, wherein the route control system is further configured to modify the updated route based on the adjustment to the desired heading for the current waypoint or the desired heading for the one or more future waypoints along the updated route in real time.

* * * * *